(12) United States Patent
Chandrasekhar et al.

(10) Patent No.: US 7,987,516 B2
(45) Date of Patent: Jul. 26, 2011

(54) SOFTWARE APPLICATION ACCESS METHOD AND SYSTEM

(75) Inventors: Ashok Chandrasekhar, Chandler, AZ (US); Jayshree Krishnan, Pleasanton, CA (US); Sridhar Shetty, Duluth, GA (US); Sugantha Subbiah, Fremont, CA (US); Victor S. Tago, Waipahu, HI (US)

(73) Assignee: International Business Machines Corporation, Armonk, NY (US)

( * ) Notice: Subject to any disclaimer, the term of this patent is extended or adjusted under 35 U.S.C. 154(b) by 902 days.

(21) Appl. No.: 11/749,816

(22) Filed: May 17, 2007

(65) Prior Publication Data
US 2008/0289021 A1 Nov. 20, 2008

(51) Int. Cl.
*G06F 7/04* (2006.01)

(52) U.S. Cl. ........... 726/28; 726/2; 726/3; 726/4; 726/9; 726/26; 726/27

(58) Field of Classification Search .................. 726/2, 3, 726/4, 9, 26, 27, 28
See application file for complete search history.

(56) References Cited

U.S. PATENT DOCUMENTS

| | | | | | |
|---|---|---|---|---|---|
| 5,163,097 | A | * | 11/1992 | Pegg | 713/183 |
| 5,739,765 | A | * | 4/1998 | Stanfield et al. | 340/825.49 |
| 5,878,127 | A | * | 3/1999 | Fleischer, III | 379/221.08 |
| 6,339,423 | B1 | * | 1/2002 | Sampson et al. | 715/854 |
| 7,149,353 | B2 | * | 12/2006 | Siegel et al. | 382/190 |
| 7,308,251 | B2 | * | 12/2007 | Karaoguz | 455/411 |
| 7,430,604 | B2 | * | 9/2008 | Balogh | 709/229 |
| 7,496,560 | B2 | * | 2/2009 | Manber et al. | 1/1 |
| 2001/0023446 | A1 | * | 9/2001 | Balogh | 709/229 |
| 2002/0112155 | A1 | | 8/2002 | Martherus et al. | |
| 2003/0023880 | A1 | * | 1/2003 | Edwards et al. | 713/201 |
| 2004/0003042 | A1 | * | 1/2004 | Horvitz et al. | 709/204 |
| 2004/0243842 | A1 | | 12/2004 | Schlereth | |
| 2005/0063615 | A1 | * | 3/2005 | Siegel et al. | 382/309 |
| 2005/0076012 | A1 | * | 4/2005 | Manber et al. | 707/3 |
| 2005/0235345 | A1 | | 10/2005 | Mitchell et al. | |
| 2006/0111125 | A1 | * | 5/2006 | Karaoguz | 455/456.2 |
| 2006/0168221 | A1 | * | 7/2006 | Juhls et al. | 709/225 |
| 2006/0195513 | A1 | * | 8/2006 | Rogers et al. | 709/203 |
| 2007/0198556 | A1 | * | 8/2007 | Nist et al. | 707/101 |
| 2007/0277228 | A1 | * | 11/2007 | Curtis et al. | 726/4 |

FOREIGN PATENT DOCUMENTS

| | | | |
|---|---|---|---|
| WO | WO2006006704 | A2 * | 1/2006 |
| WO | WO2006006704 | A3 * | 1/2006 |

* cited by examiner

*Primary Examiner* — Edan Orgad
*Assistant Examiner* — Bradley Holder
(74) *Attorney, Agent, or Firm* — Schmeiser, Olsen & Watts; John R. Pivnichny (57) ABSTRACT

An access method and system. The method includes receiving from a first user, by a software application within a computing system, a request for access to the software application. The software application determines a first domain associated with a first current location of the user. The software application determines a home domain associated with the user. The software application retrieves a set of login process rules associated with a combination of the first domain and the home domain. The software application enforces the set of login process rules. The software application transmits results of enforcing the set of login process rules.

24 Claims, 4 Drawing Sheets

SOFTWARE APPLICATION ACCESS METHOD AND SYSTEM

FIELD OF THE INVENTION

The present invention relates to a method and associated system for allowing access to a software application from a plurality of different domains.

BACKGROUND OF THE INVENTION

Accessing data from various locations typically comprises a complicated and inefficient process with little flexibility. Computing systems controlling the access to the data may enforce rigid standards for allowing access to the data. Accordingly, there exists a need in the art to overcome at least some of the deficiencies and limitations described herein above.

SUMMARY OF THE INVENTION

The present invention provides an access method comprising:

receiving from a first user, by a software application within a computing system, a first request for access to said software application, said computing system comprising a memory device, said memory device comprising data;

determining, by said software application, a first domain associated with a first current location of said first user, said first domain associated with a first set of login process rules and a first set of software application access rules;

first enforcing, by said software application, said first set of login process rules;

presenting based on said first enforcing, by said software application, a first specified login procedure for said first user;

receiving, by said software application, first login information from said first user in response to said first specified login procedure, said first login information comprising an identity for said first user;

first authenticating, by said software application, said first user based on said first login information;

determining, by said software application, a home domain associated with said first user, said home domain associated with a second set of login process rules and a second set of software application access rules, said home domain different from said first domain, said home domain associated with said first user and a first entity, said first domain associated with a second entity, said first entity different from said second entity, said software application associated with said first entity and said second entity;

retrieving, by said software application, a third set of login process rules from said data, said third set of login process rules associated with a combination of said first domain and said home domain, said third set of login process rules different from said second set of login process rules and said first set of login process rules;

second enforcing, by said software application, said third set of login process rules; and transmitting to said first user, by said software application, results of said second enforcing.

The present invention provides a computing system comprising a processor coupled to a computer-readable memory unit, said memory unit comprising data, a software application, and instructions that when executed by the processor implement an access method, said method comprising:

receiving from a first user, by said software application, a first request for access to said software application;

determining, by said software application, a first domain associated with a first current location of said first user, said first domain associated with a first set of login process rules and a first set of software application access rules;

first enforcing, by said software application, said first set of login process rules;

presenting based on said first enforcing, by said software application, a first specified login procedure for said first user;

receiving, by said software application, first login information from said first user in response to said first specified login procedure, said first login information comprising an identity for said first user;

first authenticating, by said software application, said first user based on said first login information;

determining, by said software application, a home domain associated with said first user, said home domain associated with a second set of login process rules and a second set of software application access rules, said home domain different from said first domain, said home domain associated with said first user and a first entity, said first domain associated with a second entity, said first entity different from said second entity, said software application associated with said first entity and said second entity;

retrieving, by said software application, a third set of login process rules from said data, said third set of login process rules associated with a combination of said first domain and said home domain, said third set of login process rules different from said second set of login process rules and said first set of login process rules; and second enforcing, by said software application, said third set of login process rules;

transmitting to said first user, by said software application, results of said second enforcing.

The present invention provides a process for supporting computer infrastructure, said process comprising providing at least one support service for at least one of creating, integrating, hosting, maintaining, and deploying computer-readable code in a computing system, wherein the code in combination with the computing system is capable of performing an access method, said method comprising:

receiving from a first user, by a software application within said computing system, a first request for access to said software application, said computing system comprising a memory device, said memory device comprising data;

determining, by said software application, a first domain associated with a first current location of said first user, said first domain associated with a first set of login process rules and a first set of software application access rules;

first enforcing, by said software application, said first set of login process rules;

presenting based on said first enforcing, by said software application, a first specified login procedure for said first user;

receiving, by said software application, first login information from said first user in response to said first specified login procedure, said first login information comprising an identity for said first user;

first authenticating, by said software application, said first user based on said first login information;

determining, by said software application, a home domain associated with said first user, said home domain associated with a second set of login process rules and a second set of software application access rules, said home domain different from said first domain, said home domain associated with said first user and a first entity, said first domain associated with a second entity, said first entity different from said second entity, said software application associated with said first entity and said second entity;

retrieving, by said software application, a third set of login process rules from said data, said third set of login process rules associated with a combination of said first domain and said home domain, said third set of login process rules different from said second set of login process rules and said first set of login process rules; and second enforcing, by said software application, said third set of login process rules;

transmitting to said first user, by said software application, results of said second enforcing.

The present invention provides a computer program product, comprising a computer usable medium comprising data and a computer readable program code embodied therein, said computer readable program code adapted to implement an access within a computing system, said method comprising:

receiving from a first user, by a software application within said computing system, a first request for access to said software application;

determining, by said software application, a first domain associated with a first current location of said first user, said first domain associated with a first set of login process rules and a first set of software application access rules;

first enforcing, by said software application, said first set of login process rules;

presenting based on said first enforcing, by said software application, a first specified login procedure for said first user;

receiving, by said software application, first login information from said first user in response to said first specified login procedure, said first login information comprising an identity for said first user;

first authenticating, by said software application, said first user based on said first login information;

determining, by said software application, a home domain associated with said first user, said home domain associated with a second set of login process rules and a second set of software application access rules, said home domain different from said first domain, said home domain associated with said first user and a first entity, said first domain associated with a second entity, said first entity different from said second entity, said software application associated with said first entity and said second entity;

retrieving, by said software application, a third set of login process rules from said data, said third set of login process rules associated with a combination of said first domain and said home domain, said third set of login process rules different from said second set of login process rules and said first set of login process rules; and second enforcing, by said software application, said third set of login process rules;

transmitting to said first user, by said software application, results of said second enforcing.

The present invention advantageously provides a method and associated system capable of allowing access to data from a plurality of different domains.

DETAILED DESCRIPTION OF THE INVENTION

Figure 1:
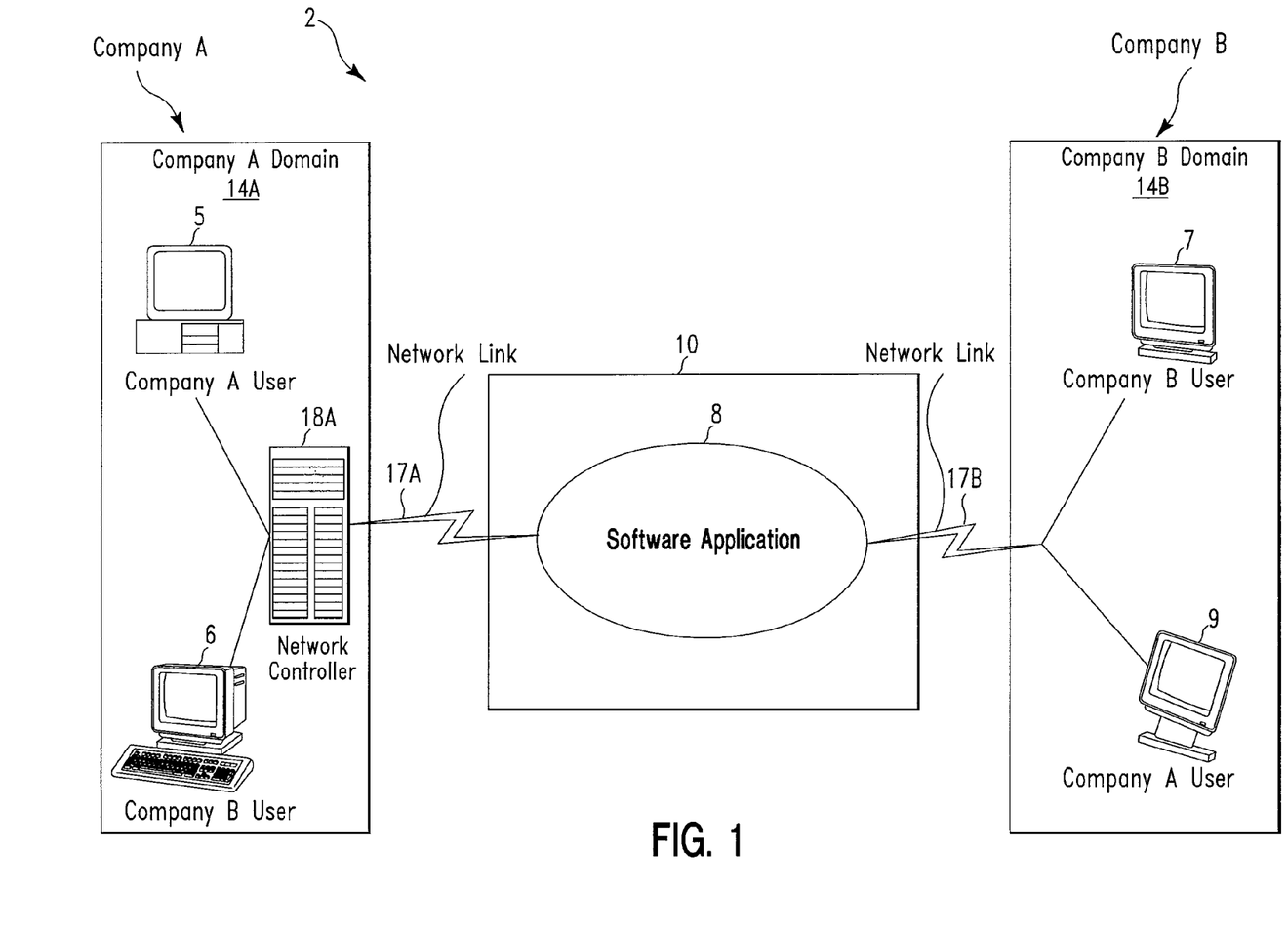
FIG. 1 illustrates a system for allowing a user to access a shared software application from a plurality of different domains, in accordance with embodiments of the present invention.

FIG. 1 illustrates a system 2 for allowing a user to access a shared software application 8 from a plurality of different domains, in accordance with embodiments of the present invention. Software application 8 is shared between 2 different organizational entities each comprising a different domain for accessing software application 8. The different organizational entities may comprise any type of entities including, inter alia, companies, organizations, groups, etc. System 2 in FIG. 1 comprises company A and company B. Company A comprises domain 14A and company B comprises domain 14B. Although system 2 in FIG. 1 only illustrates 2 companies (i.e., company A and company B) and 2 domains (i.e., domain 14A and domain 14B) sharing access to shared software application 8, note that system 2 in FIG. 1 may comprise any number of companies or entities comprising different domains sharing access to software application 8. A domain is defined herein as a group of computers in a network that are controlled as a unit for access purposes. Each computer comprises the same rules and procedures across the domain. All the computers on the domain may share a common part of the Internet protocol (IP) address.

System 2 allows an authentication process for users trying to access software application 8 to be customized based on special rules that take into account a home domain for the user (i.e., a domain comprised by the users company) and an away domain from which software application 8 is being accessed. For example, a company A user may have one set of authentication rules when he/she accesses software application 8 from company A domain 14A and different or a special set of authentication rules if he/she wants to access software application 8 from company B domain 14B. This special set of rules is customized and is different from any rules applicable to company B users accessing software application 8 from company B domain 14B. System 2 allows for the protection of shared software applications, accessible from multiple domains, when users are not restricted to one domain. System 2 allows for:

1. Enforcing domain specific authentication rules (i.e., enforcing authentication rules based on which company a user belongs to and from which domain the user is trying to access software application 8 from). For example, system 2 may force a Company A user to use different passwords based on domain or force the Company A user to authenticate twice with a different user ID or password if they are away from their home domain. System 2 may enforce many different types of domain specific rules based on a combination set of rules associated with a home domain and an away domain from where the user is trying to access software application 8.

2. Enforcing domain specific software application access rules. System may be customized to allow access to specific parts of software application 8 based on a combination set of rules associated with a home domain and an away domain from where the user is trying to access software application 8. The specific parts of software application 8 may be associated with roles and authority to perform actions associated with the specific parts of the software application.

3. Enforcing domain software application access restriction rules based on which company a user belongs to and from which domain the user is trying to access software application 8 from.

System 2 comprises a computing system 10, company A domain 14A, and company B domain 14B. Computing system 10 comprises shared software application 8. Domain 14A comprises a computer terminal 5, a computer terminal 6, and a network controller 18A (note, that network controller 18A is shown for illustration purposes only and that any type of network management device may be used). Computer terminal 5 is used by a company A employee accessing software application 8 from domain 14A (i.e., home domain). Computer terminal 6 is used by a company B employee accessing software application 8 from domain 14A (i.e., away domain). Domain 14A is connected to computing system 10 through a network link 17A. Domain 14B comprises a computer terminal 7 and a computer terminal 9. Computer terminal 7 is used by a company B employee accessing software application 8 from domain 14B (i.e., home domain). Computer terminal 8 is used by a company A employee accessing software application 8 from domain 14B (i.e., away domain). Domain 14B is connected to computing system 10 through a network link 17B.

In system 2 software application 8 is shared by multiple organizations (i.e., Company A and Company B). Under normal circumstances the users of each company (i.e., company A and company B) may access software application 8 from their own associated domain (i.e., company A users access the home domain 14A using computer terminal 5 and company B users access the home domain 14B using computer terminal 7). Each company has their own rules to access software application 8 and authenticate the user. Therefore, company A has its own rules and company B has its own rules. In system 2, a Company A user may access software application 8 from an "away" domain via computer terminal 8 (i.e. the user is accessing software application through Company A domain even though the user belongs to Company B) and a Company B user may access software application 8 from an "away" domain via computer terminal 6 (i.e. the user is accessing software application through Company B domain even though the user belongs to Company A). In either case, system 2 will determine that the user is not from the home domain and apply a special set of rules based on a combination of home domain and away domain rules. The special set of rules may call for a second authentication process for the user, a different type of authentication process for the user, a denial of access for the user, enabling access for the user to only specified portions of software application 8, etc. The special set of rules is different as compared to company A rules and company B rules. Additionally, if there was a company C and a company B user tried to access software application from the company C domain, another set of rules based on the home and away domains for the company C user would apply.

The following description illustrates multiple examples of implementation for allowing a user to access shared software application 8 from a plurality of different domains, in accordance with embodiments of the present invention. There are many different types of rules that may be enforced. These rules are customized to the specific situation that the organizations and entities agree upon.

Example 1

Example 1 illustrates the use of different passwords for different domains. In example 1, Joe, an employee of company A uses a password 123456 to access software application 8 when using domain 14A. When Joe goes to company B and accesses software application 8 from domain 14B, the password he must use is abcdef. Therefore, password 123456 will not work from the company B domain (domain 14B) but will work from the company A domain (domain 14A).

Example 2

Example 2 illustrates the use of multiple authentications for authenticating a user for access to software application from a non-home (away) domain. In example 2, Jane is an employee of company A but works a majority of the time at the company B facility. Her user ID is JaneA and her password is 123456 when using the company A domain 14A. Company B has single sign on (SSO) process for accessing software application 8 and insists that all employees on the domain 14B use the SSO user ID and password. Therefore, when Jane is accessing software application 8 via domain 14B, she uses the user ID JaneB and password 111222 to log in to company B SSO. Sarah, a company B employee working from company B domain 14B has a user ID of SarahB and password of 222333. Sarah usually accesses software application 8 from company B domain 14B using the user ID SarahB and password 222333 for to software application 8. If Jane accesses software application 8 from company A domain 14A, she will use the user ID of JaneA and password 123456 thereby enabling access to software application 8.

Assume that Jane is working from the company B domain 14B one day. First she will go into the company B single sign on system and log in using the user ID of JaneB and password of 111222. Upon receiving the user ID of JaneB, software application 8 recognizes that Jane belongs to Company A and is accessing software application 8 from the company B domain 14B. Software application 8 will then force Jane to again authenticate using her company A user ID and password (JaneA and password 123456). Therefore, Jane has to authenticate twice in when using domain 14B.

Example 3

Example 3 illustrates a denial of access process if a user tries to access software application 8 from non-home domain. Company A employees often work at company B. Company B has an SSO and company A employees may have a company B SSO user ID and password. System 2 may be configured to allow only company B employees to use this SSO to access software application 8. Therefore, a company A employee who tries to use the SSO system on Company B network will be denied access and asked to access software application 8 using a special tunneling software. However company A employees may directly access software application 8 when they are in their home domain.

Example 4

Example 4 illustrates authorizing different roles based on a domain from which software application 8 is accessed. In this example, company A employees may view all details about a request when they are on the company A domain 14A. Company B users, on the other hand, may only see limited details (e.g., just 4 web pages) irrespective of the domain. For security purposes, company A does not want any of their users to have full access to software application 8 (e.g., only able to view only 4 web pages) if they access software application 8 from the company B domain 14B. System 2 allows for role based views based on a domain of entry even if the authentication mechanism is the same (i.e., domain specific roles).

Figure 2:
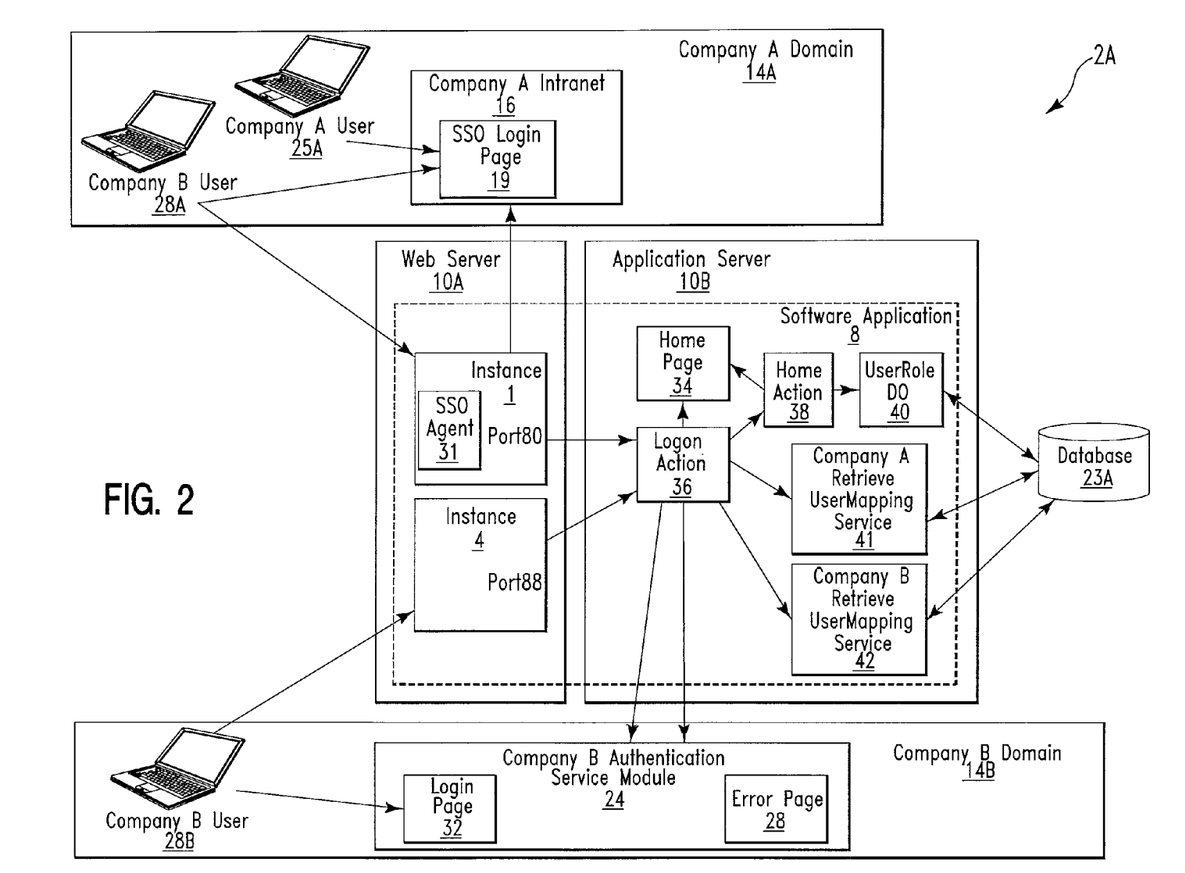
FIG. 2 illustrates a detailed view of the system of FIG. 1 for allowing a user to access shared software application from a plurality of different domains, in accordance with embodiments of the present invention.

FIG. 2 illustrates a system 2A for allowing a user to access shared software application 8 from a plurality of different domains, in accordance with embodiments of the present invention. System 2A of FIG. 2 illustrates a detailed view of system 2 of FIG. 1. System 2A comprises company A domain, company B domain, web server 10A, application server 10B, and database 23. Web server 10A and application server 10B are comprised by computing system 10 of FIG. 1. Web server 10A and application server 10B each comprise hardware and software components where software application 8 resides. Web server 10A allows users to access software application 8 using a web browser. Application server 10B comprises business logic for software application 8. Web server 10A comprises an instance 1 and an instance 4. An instance is defined herein as a web server that is associated with software application 8. Instance 1 comprises a port 80 and instance 4 comprises a port 88. A port is defined herein as an interface through which data are sent and received. These interfaces may be configured such that data in a given port may be received from only a specified domain. Instance 1 comprises an SSO agent 31. An SSO agent is a piece of software that resides in software application 8 but interfaces with an SSO system in order to make sure that a person has been authenticated by the SSO. Application server comprises software application 8. Software application 8 comprises a home page 34, a logon action module 36, a home action module 38, a user role DO module 40, a company A retrieve user mapping service action module 41, and a company B retrieve user mapping service action module 42. Home page 34 comprises a first page that a user will see after successfully logging into software application 8. Home page 34 will illustrate which parts of software application 8 that the user may access based on the user's roles. A role is defined herein as specific rights, responsibilities, and views for a user. Some users may have the right to approve requests, while others may not. Some users may be able to view or edit any records. Therefore, each user of software application 8 will have specific permissions (i.e., roles). Logon action module 36 is a gate-keeper of software application 8. Logon action module 36 comprises most of the business logic to control who may access software application 8. This is accomplished by either its own internal logic or by calling other modules in software application 8 such as, inter alia, home action module 38, user role DO module 40, and retrieve user mapping service modules (e.g., company A retrieve user mapping service action module 41 and company B retrieve user mapping service action module 42). Home action module 38 is an application module that is called by logon action module 36 in order to display the user's home page 34 based on the user's roles. This module determines which parts of the application may be accessed by the user. User role DO action module 40 is an application module that is called by home action module 38 in order to retrieve the roles of the user. Retrieve user mapping service action is an application module that is called by logon action module 36 in order to determine whether a user is a registered user of a company. Retrieve user mapping service retrieves user data (e.g., a user profile) from database 23. There are be several versions of this module, one for each company (e.g., company A retrieve user mapping service action module 41 and company B retrieve user mapping service action module 42). Company A domain 14A comprises a company A Intranet 16, a company A user 25A and a company A user 28A. Company A Intranet comprises a SSO login page 19. In a SSO system, a software application does not maintain the user ID and password, so if a person comes to an SSO protected system, the user is redirected to SSO login page 19 in order to enter their user ID and password. Company B domain 14B comprises a company B authentication service module 24 and a company B user 28B. Company B authentication service module 24 is used for security purposes. Software application 8 may require users to enter their user ID and password which are checked against their records to male sure that the user requesting access is a person who is authorized to do so. This process of validating authorization is called authentication. There are many different methods or mechanisms or services to manage authentication including:

1. Single sign on (SSO)—SSO comprises a central authorizing system where the user has to authenticate just once and he/she will be able to log on to all SSO protected software applications. System 2A may require a user to authenticate again if the business rules require it.
2. Lightweight directory access protocol (LDAP)—LDAP is used to help manage user IDs and passwords.
3. Custom authentication services that do not use LDAP.

Each of the aforementioned authentication mechanisms may use cookies, sessions, credentials, etc. Company B authentication service module 24 comprises a login page 32 and an error page 28. Login page 32 is a web page where the user is expected to put in at the minimum, their user ID (i.e. identifying themselves). In most cases, Login page 32 will require the user to at least put in their user ID and password and might require some more information like additional questions etc. The information captured on login page 32 is then used to authenticate the user. Error page 28 is used to deny access to software application 8.

Software application 8 is hosted on a standard architecture for web-based software applications and uses web server 10A and application server 10B. In system 2A there are multiple instances of web server 10A and each instance of web server 10A is dedicated to a specific domain. The instances may be accessed through specific ports (e.g., port 80 and 88). Each port is typically dedicated to one specific domain and one specific instance.

System 2A comprises company A domain 14A and company B domain 14B with users who may access software application 8 from either domain. Each domain comprises its own authentication service or system. Although company A authentication service comprises a SSO, note that system 2A may be customized to work with any type of authentication mechanism/authentication service. In system 2A, a user from company A will always access instance 1 and user coming from Company B will access Instance 4. Each web server instance is associated with a particular URL and each URL is associated with a specific domain. Each domain is typically associated with a pre-specified port. In system 2A, company A domain 14A is associated with port 80 and company B domain 14B with port 88.

In order to request access to software application 8, a user may click on a URL and web server 10A receives the request. Web server 10A is configured to determine a first authentication action based on a domain that the user is coming from. If Company A has an SSO, web server 10A will ensure that the user is properly authenticated using company A's SSO. If, for example, company B has a LDAP, web server 10A will ensure that the user is authenticated using company B's LDAP. Therefore, web server 10A will enforce initial authentication rules for the domain that the user is coming from. Once an initial authentication has been completed, web server 10A passes on the user ID information and the domain that the user is coming from to application server 10B. Within application server 10B, resides various action modules (e.g., logon action module 36, home action module 38, user role DO module 40, retrieve user mapping service action 41 and 42, etc). These action modules collectively determine if any other rules or any additional authentication processes must be enforced before the user may be allowed to access software application 8. The rules depend upon a combination of the access from an away domain and home domain. Therefore, company B user 28A attempting to access software application 8 from company A domain 14A, will have one set of rules.

The following steps illustrate an example of implementation for using system 2A for allowing company B user 28A (i.e., whose home domain is company B domain 14B) to access software application 8 from company A domain 14A. Custom rules applied in this case would not have been applied if company B user 28A had accessed software application 8 from his/her home domain (i.e., company B domain 14B).

1. Company B user 28A on Company A domain 14A opens an Internet browser, (e.g., Internet Explorer). Internet Browsers are software applications that allow a person to access a web application on the Internet. Company B user 28A enters a URL of software application 8. A URL is a standard way of accessing a web application using a web browser. In system 2A, company A has its own URL and company B has its own URL to access software application 8. Company B user 28A is assumed to be connected to company A domain 14A and therefore would access software application 8 using the company A URL.

2. When user 28A enters the company A URL in order to access software application 8, the request is routed to web server 10A via web server instance 1. Web server instance 1 detects the request. Company A uses SSO to authenticate user 28A.

3. Company B user 28A enters his/her credentials into SSO. When company B user 28A has been successfully authenticated in company A's SSO, web server instance 1 forwards the request to application server 10B.

4. Software application 8 through logon action module 36 and retrieve user mapping service module 41 determines that company B user 28A is accessing software application 8 from Company A domain 14A but is not a registered Company A.

5. Software application 8 through logon action module 36 will apply special processing to company B user 28A (e.g., will not directly allow company B user 28A to log in without understanding the circumstances of the case). Software application 8 will invoke a module that determines additional business rules necessary to be applied for company B user 28A. For example, a first rule may comprise instructions specifying that when company B user 28A logs in from Company A's domain, he/she should be redirected to the log in page used by company B users and he/she again logs in using their company B user ID and password. A second rule may comprise instructions specifying company B user 28A is not allowed to log in from company A domain 14A using company A's URL and an error message is displayed informing company B user 28A that they may not access software application 8 from company A domain 14A. A third rule may comprise instructions allowing company B user 28A to access software application 8 but limit his/her access to only certain sections of software application 8 (e.g., only two links are visible from domain 14A instead of four links that he/she would normally see when connected from his/her home domain 14B.

6. In this example, Company B user 28A is required to authenticate again on company A domain 14A. Software application 8 through logon action module 36 presents (i.e., redirects) company B user 28A to Login page 32 on authentication service module 24. Authentication service module 24 instructs company B user 28A to enter a company B user ID and password. Upon successful authentication, the process goes to step 7.

7. Logon action module 36 calls home action module 38. Home action module 38 uses user role DO action module 40 in order to obtain the correct roles. In response, home action module 38 serves up (shows to the user) home page 34 with the correct roles so that company B user 28A may access and use software application 8.

8. An alternate example (i.e., to the authenticate again example illustrated in step 6) comprises a rule specifying that access will be denied if Company B user 28A attempts to access software application 8 via company A domain 14A. In this case, logon action module 36 would redirect company B user 28A to error page 28, instructing Company B user 28A is to access software application 8 from company B domain 14B. This alternate example illustrates that different rules may be applied resulting in different outcomes.

Figure 3:
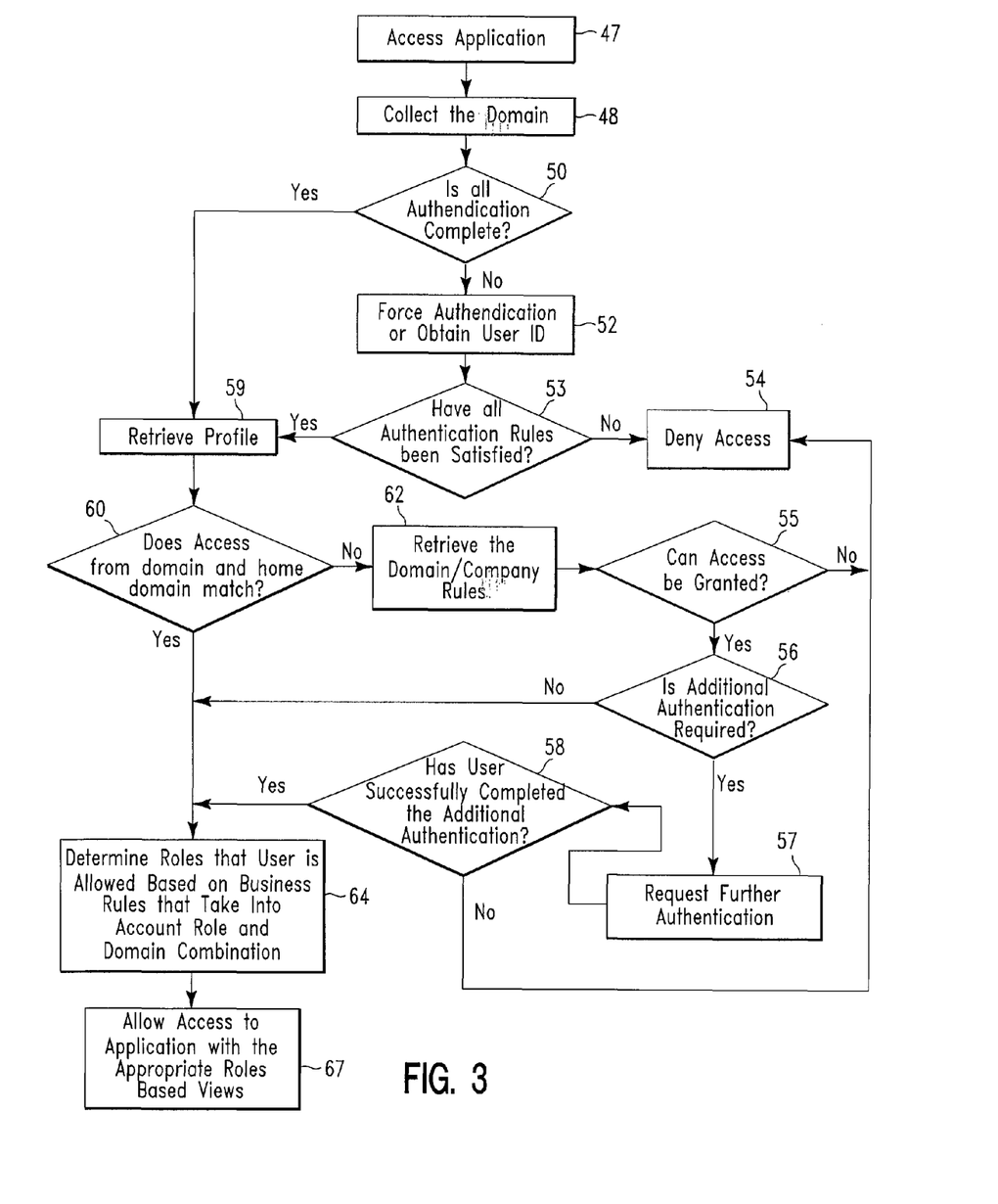
FIG. 3 illustrates a flowchart describing an overall algorithm used by the systems of FIG. 1 and FIG. 2 for allowing a user to access a shared software application from a plurality of different domains, in accordance with embodiments of the present invention.

FIG. 3 illustrates a flowchart describing an overall algorithm used by system 2 of FIG. 1 and system 2A of FIG. 2 FIG. 1 for allowing a user to access a shared software application 8 from a plurality of different domains, in accordance with embodiments of the present invention. In step 47, users attempt to access software application 8 from either company A domain 14A or company B domain 14B. In step 48, software application 8 (i.e., through logon action module 36 of FIG. 2) determines which domain that user is coming from (i.e. logon action module 36 senses that the user who is making the request is coming from domain 14A or 14B. The domain is recorded. In step 50, logon action module 36 determines if the authentication process for the domain from step 48 is based on pre-defined rules and determines if the authentication process is complete. For example if domain 14A requires a SSO credential, logon action module 36, based on predefined business rules, checks to see if the credential is available and complete. If domain 14B requires a valid user ID and password checked against a LDAP, logon action module 36 determines if the user provided any necessary details.

If in step 50, logon action module 36 determines that the authentication process is complete (i.e. all rules have been satisfied) then in step 59, logon action module 36 initiates retrieve user mapping service action that retrieves from database 23, a profile of the user based on the user ID entered during logon action and the domain from which the user accesses software application 8. The profile includes the home domain of the user and the rules that need to be applied in case they are coming from a different domain. In step 60, logon action module 36 determines if the home domain (i.e., for the user) and the domain that user is accessing software application 8 are the same.

If in step 60, logon action module 36 determines that the home domain (i.e., for the user) and the domain that user is accessing software application 8 are not the same then in step 62, logon action module 36 retrieves pre-defined business rules that determine a next step based on the combination of the user profile and domain they are accessing from. In step 55, logon action module 36 determines if access may be granted or denied. If in step 55, logon action module 36 determines that access is denied then in step 54, access to software application 8 is denied. If in step 55, logon action module 36 determines that access is granted then in step 56, based on the user profile and predefined business rules, logon action module 36 determines if additional authentication is required. If in step 56, logon action module 36 determines that additional authentication is not required then step 64 is executed as described, infra. In step 57, the user must provide further authentication. In step 58, it is determined if the user has completed the additional authentication requested in step 57. If in step 58, it is determined that the user has completed the additional authentication then step 64 is executed as described, infra. If in step 58, it is determined that the user has not completed the additional authentication then in step 54, the user is denied access to software application 8.

If in step 60, logon action module 36 determines that the home domain (i.e., for the user) and the domain that user is accessing software application 8 are the same then in step 64, logon action module 36 passes user data to home action module 38. Home action module (i.e., using user role DO module 40) determines a correct role for that combination of domain and user profile. In step 67, home action module 38 displays the homepage to the user based on the roles and allows the user to use software application 8.

If in step 50, logon action module 36 determines that the authentication process is not complete (i.e. all rules have not been satisfied) then in step 52, logon action module 36 forces the user to authenticate using pre-defined business rules. For example, the user may be asked to enter a user ID and password which are checked against an LDAP. Alternatively, the user may be redirected to a SSO application in company A domain 14A and asked to complete the rules for SSO. In step 53, logon action module 36 determines if all the authentication rules have been satisfied. If in step 53, logon action module 36 determines that all of the authentication rules have been satisfied then step 59 is executed as described, supra. If in step 53, logon action module 36 determines that all of the authentication rules have not been satisfied then step 54, access to software application 8 is denied.

Figure 4:
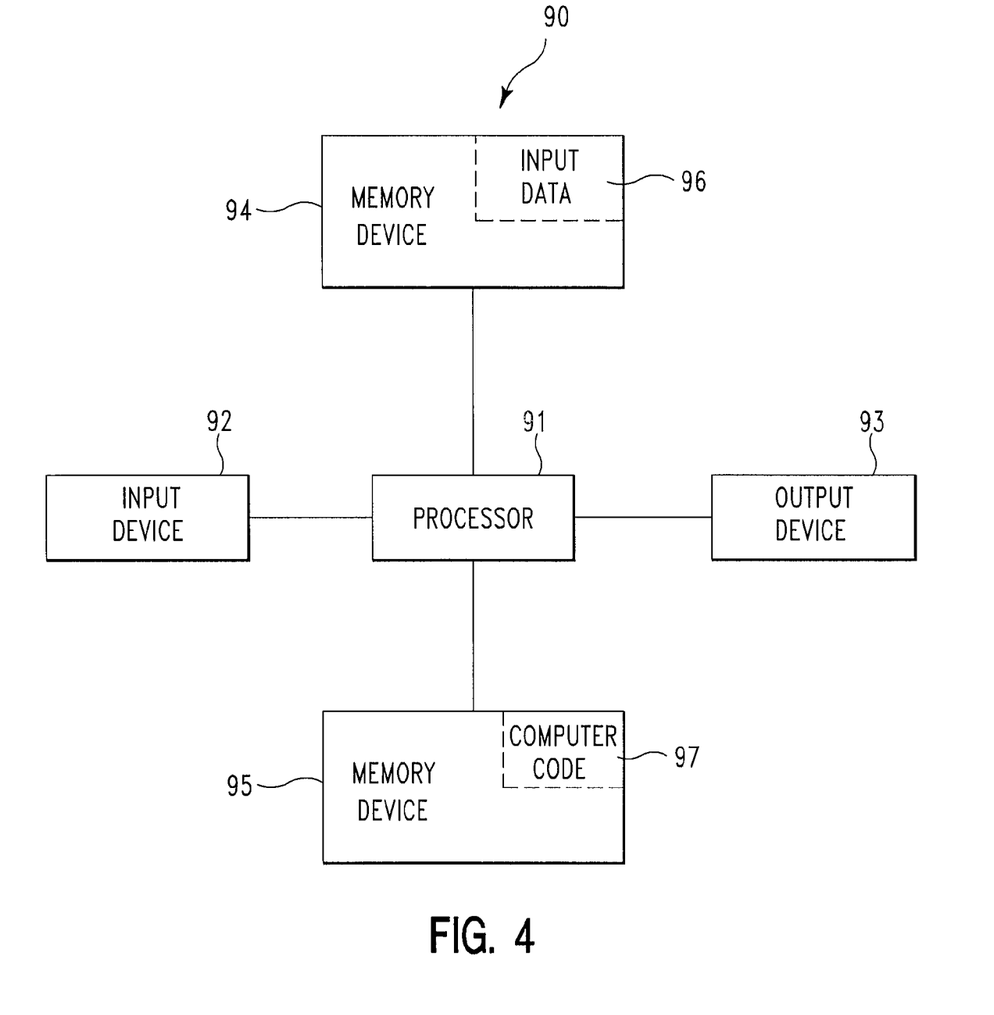
FIG. 4 illustrates a computer apparatus used for allowing a user to access a shared software application from a plurality of different domains, in accordance with embodiments of the present invention.

FIG. 4 illustrates a computer apparatus 90 (e.g., computing system 27 of FIG. 1) used for allowing a user to access a shared software application from a plurality of different domains, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 3) for allowing a user to access a shared software application from a plurality of different domains. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may comprise the algorithm of FIG. 3 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be deployed, managed, serviced, etc. by a service provider who offers allow a user to access a shared software application from a plurality of different domains. Thus the present invention discloses a process for deploying or integrating computing infrastructure, comprising integrating computer-readable code into the computer system 90, wherein the code in combination with the computer system 90 is capable of performing a method for allowing a user to access a shared software application from a plurality of different domains. In another embodiment, the invention provides a business method that performs the process steps of the invention on a subscription, advertising, and/or fee basis. That is, a service provider, such as a Solution Integrator, could offer to allow a user to access a shared software application from a plurality of different domains. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. An access method comprising:

receiving from a first user associated with a home company, by a software application within a computing system, a first request for access to said software application, said computing system comprising a memory device, said memory device comprising data;

determining, by said software application, a first domain associated with a first current location of said first user, said first domain associated with a first set of login process rules, a first company Intranet for a first company differing from said home company, a first Web server instance consisting of a first port, and a first set of software application access rules, said home company residing at a location differing from said current location;

first enforcing, by said software application, said first set of login process rules; presenting in response to said first enforcing and said first request, by said software application, a first specified login procedure for said first user;

receiving, by said software application, first login information from said first user in response to said first specified login procedure, said first login information consisting of a first user identity and a first password for said first user, wherein said first password comprises a first alpha numeric sequence;

first authenticating, by said software application, said first user based on said first login information;

after said first authenticating determining, by a computer processor executing said software application, a home domain associated with said first user, said home domain associated with a second set of login process rules, a second Web server instance comprising a second port, said home company, and a second set of software application access rules, said home domain different from said first domain, said home domain associated with said first user and said home company, said first domain associated with said first company, said home company different from said first company, said software application associated with said first company and said home company, said first domain associated with said first port, said home domain associated with said second port, said first port differing from said second port;

presenting, by said software application in response to said determining said home domain and said first request, an additional login procedure for said first user based on said second set of software application access rules;

receiving, by said software application, additional login information from said first user in response to said second specified login procedure, said second login information consisting of an additional user identity and a second password for said first user, wherein said second password comprises a second alpha numeric sequence differing from said first alpha numeric sequence, said second user identity differing from said first user identity;

additionally authenticating, by said software application, said first user based on said additional login information;

determining, by said software application executing a plurality of action modules, a third set of login process rules, said third set of login process rules associated with a combination of said first domain and said home domain, said third set of login process rules different from said second set of login process rules and said first set of login process rules, said plurality of action modules comprising a login action module, a home action module, a user role module, and a user mapping service module;

retrieving, by said software application, said third set of login process rules from said data;

second enforcing, by said software application, said third set of login process rules;

transmitting to said first user, by said software application, results of said second enforcing, wherein said third set of login process rules comprises a rule specifying a second specified login procedure for said first user;

presenting in response to said second enforcing and said first request, by said software application, said second specified login procedure for said first user;

receiving, by said software application, second login information from said first user in response to said second specified login procedure, said second specified login information consisting of a home company identity and a second password for said first user said second password consisting of a second alpha numeric sequence differing from said first alpha numeric sequence;

second authenticating, by said software application, said first user in response to said second login information;

transmitting to said first user, by said software application, authentication data in response to said second authenticating;

enforcing, by said software application, a first additional set of login process rules;

presenting based on said enforcing said first additional set of login process rules, by said software application, a first additional specified login procedure for said first user;

receiving, by said software application, first additional login information from said first user in response to said first additional specified login procedure, said first additional login information consisting of an alternative user identity and an alternative password for said first user;

authenticating, by said software application, said first user based on said first additional login information;

authorizing, by said software application based on said authenticating, said first authenticating, said additionally authenticating, and said second authenticating, said first user to access portions of said software application, said portions of said software application associated with first specified roles and authority to perform first actions associated with said portions of said software application; and disabling, by said software application based on said first set of login process rules, said first set of software application access rules, and an association with said first port and said second port, said first user from accessing additional portions of said software application.

2. The method of claim 1, further comprising:

retrieving, by said software application, a third set of software application access rules from said data, said third set of software application access rules associated with said combination of said first domain and said home domain, said third set of software application access rules different from said second set software application access rules and said first set of software application access rules;

third enforcing, by said software application, said third set of software application access rules;

determining, by said software application, a first set of sections of said software application that said first user is allowed to access, said determining said first set of sections based on said third enforcing;

authorizing, by said software application, said first user to access first set of sections of said software application, said first set of sections of said software application associated with roles and authority to perform actions associated with said first set of sections of said software application; and transmitting to said first user, by said software application, authorization data associated with said authorizing in response to said authorizing.

3. The method of claim 2, further comprising:

receiving from said first user, by said software application, a command for disabling said access to said first set of sections of said software application;

receiving from said first user, by a software application within a computing system, a second request for access to said software application;

determining, by said software application, a second domain associated with a second current location of said first user, said second domain different from said first domain and said home domain, said second domain associated with a fourth set of login process rules and a fourth set of software application access rules, said fourth set of software application access rules different from said third set of software application access rules, said second set software application access rules, and said first set of software application access rules, said fourth set of login process rules different from said third set of login process rules, said second set of login process rules, and said first set of login process rules;

fourth enforcing, by said software application, said fourth set of login process rules;

presenting based on said fourth enforcing, by said software application, a third specified login procedure for said first user;

receiving, by said software application, third login information from said first user in response to said third specified login procedure, said third login information comprising said identity for said first user;
third authenticating, by said software application, said first user based on said third login information;
determining, by said software application, said home domain associated with said first user, said home domain different from said second domain;
retrieving, by said software application, a fifth set of login process rules from said data, said fifth set of login process rules associated with a combination of said second domain and said home domain, said fifth set of login process rules different from said fourth set of login process rules, said third set of login process rules, said second set of login process rules, and said first set of login process rules; and
fifth enforcing, by said software application, said fifth set of login process rules;
transmitting to said first user, by said software application, results of said fifth enforcing.

4. The method of claim 3, wherein said first domain comprises a first computer network, wherein said second domain comprises a second computer network, and wherein said first computer network is different from said second computer network.

5. The method of claim 1, wherein said third set of login process rules comprises a rule denying said first user from accessing said software application, and wherein said method further comprises:
denying based on said second enforcing, by said software application, said first user from accessing said software application.

6. The method of claim 1, wherein said data comprises a user profile, and wherein said user profile comprises said third set of login process rules.

7. A computing system comprising a computer processor coupled to a computer-readable memory unit, said memory unit comprising data, a software application, and instructions that when executed by the computer processor implement an access method, said method comprising:
receiving from a first user associated with a home company, by said software application, a first request for access to said software application;
determining, by said software application, a first domain associated with a first current location of said first user, said first domain associated with a first set of login process rules, a first company Intranet for a first company differing from said home company, a first Web server instance consisting of a first port, and a first set of software application access rules, said home company residing at a location differing from said current location;
first enforcing, by said software application, said first set of login process rules;
presenting in response to said first enforcing and said first request, by said software application, a first specified login procedure for said first user;
receiving, by said software application, first login information from said first user in response to said first specified login procedure, said first login information consisting of a first user identity and a first password for said first user, wherein said first password comprises a first alpha numeric sequence;
first authenticating, by said software application, said first user based on said first login information;
after said first authenticating determining, by said computer processor executing said software application, a home domain associated with said first user, said home domain associated with a second set of login process rules, a second Web server instance comprising a second port, said home company, and a second set of software application access rules, said home domain different from said first domain, said home domain associated with said first user and said home company, said first domain associated with said first company, said home company different from said first company, said software application associated with said first company and said home company, said first domain associated with said first port, said home domain associated with said second port, said first port differing from said second port;
presenting, by said software application in response to said determining said home domain and said first request, an additional login procedure for said first user based on said second set of software application access rules;
receiving, by said software application, additional login information from said first user in response to said second specified login procedure, said second login information consisting of an additional user identity and a second password for said first user, wherein said second password comprises a second alpha numeric sequence differing from said first alpha numeric sequence, said second user identity differing from said first user identity;
additionally authenticating, by said software application, said first user based on said additional login information;
determining, by said software application executing a plurality of action modules, a third set of login process rules, said third set of login process rules associated with a combination of said first domain and said home domain, said third set of login process rules different from said second set of login process rules and said first set of login process rules, said plurality of action modules comprising a login action module, a home action module, a user role module, and a user mapping service module;
retrieving, by said software application, said third set of login process rules from said data;
second enforcing, by said software application, said third set of login process rules;
transmitting to said first user, by said software application, results of said second enforcing, wherein said third set of login process rules comprises a rule specifying a second specified login procedure for said first user;
presenting in response to said second enforcing and said first request, by said software application, said second specified login procedure for said first user;
receiving, by said software application, second login information from said first user in response to said second specified login procedure, said second specified login information consisting of a home company identity and a second password for said first user said second password consisting of a second alpha numeric sequence differing from said first alpha numeric sequence;
second authenticating, by said software application, said first user in response to said second login information;
transmitting to said first user, by said software application, authentication data in response to said second authenticating;
enforcing, by said software application, a first additional set of login process rules;

presenting based on said enforcing said first additional set of login process rules, by said software application, a first additional specified login procedure for said first user;

receiving, by said software application, first additional login information from said first user in response to said first additional specified login procedure, said first additional login information consisting of an alternative user identity and an alternative password for said first user;

authenticating, by said software application, said first user based on said first additional login information;

authorizing, by said software application based on said authenticating, said first authenticating, said additionally authenticating, and said second authenticating, said first user to access portions of said software application, said portions of said software application associated with first specified roles and authority to perform first actions associated with said portions of said software application; and disabling, by said software application based on said first set of login process rules, said first set of software application access rules, and an association with said first port and said second port, said first user from accessing additional portions of said software application.

8. The computing system of claim 7, wherein said method further comprises:

retrieving, by said software application, a third set of software application access rules from said data, said third set of software application access rules associated with said combination of said first domain and said home domain, said third set of software application access rules different from said second set software application access rules and said first set of software application access rules;

third enforcing, by said software application, said third set of software application access rules;

determining, by said software application, a first set of sections of said software application that said first user is allowed to access, said determining said first set of sections based on said third enforcing;

authorizing, by said software application, said first user to access first set of sections of said software application, said first set of sections of said software application associated with roles and authority to perform actions associated with said first set of sections of said software application; and transmitting to said first user, by said software application, authorization data associated with said authorizing in response to said authorizing.

9. The computing system of claim 8, wherein said method further comprises:

receiving from said first user, by said software application, a command for disabling said access to said first set of sections of said software application;

receiving from said first user, by a software application within a computing system, a second request for access to said software application;

determining, by said software application, a second domain associated with a second current location of said first user, said second domain different from said first domain and said home domain, said second domain associated with a fourth set of login process rules and a fourth set of software application access rules, said fourth set of software application access rules different from said third set of software application access rules, said second set software application access rules, and said first set of software application access rules, said fourth set of login process rules different from said third set of login process rules, said second set of login process rules, and said first set of login process rules;

fourth enforcing, by said software application, said fourth set of login process rules;

presenting based on said fourth enforcing, by said software application, a third specified login procedure for said first user;

receiving, by said software application, third login information from said first user in response to said third specified login procedure, said third login information comprising said identity for said first user;

third authenticating, by said software application, said first user based on said third login information;

determining, by said software application, said home domain associated with said first user, said home domain different from said second domain;

retrieving, by said software application, a fifth set of login process rules from said data, said fifth set of login process rules associated with a combination of said second domain and said home domain, said fifth set of login process rules different from said fourth set of login process rules, said third set of login process rules, said second set of login process rules, and said first set of login process rules; and fifth enforcing, by said software application, said fifth set of login process rules;

transmitting to said first user, by said software application, results of said fifth enforcing.

10. The computing system of claim 9, wherein said first domain comprises a first computer network, wherein said second domain comprises a second computer network, and wherein said first computer network is different from said second computer network.

11. The computing system of claim 7, wherein said third set of login process rules comprises a rule denying said first user from accessing said software application, and wherein said method further comprises:

denying based on said second enforcing, by said software application, said first user from accessing said software application.

12. The computing system of claim 7, wherein said data comprises a user profile, and wherein said user profile comprises said third set of login process rules.

13. A process for supporting computer infrastructure, said process comprising providing at least one support service for at least one of creating, integrating, hosting, maintaining, and deploying computer-readable code in a computing system, wherein the code in combination with the computing system is capable of performing an access method, said method comprising:

receiving from a first user associated with a home company, by a software application within said computing system, a first request for access to said software application, said computing system comprising a memory device, said memory device comprising data;

determining, by said software application, a first domain associated with a first current location of said first user, said first domain associated with a first set of login process rules, a first company Intranet for a first company differing from said home company, a first Web server instance consisting of a first port, and a first set of software application access rules, said home company residing at a location differing from said current location;

first enforcing, by said software application, said first set of login process rules;

presenting in response to said first enforcing and said first request, by said software application, a first specified login procedure for said first user;

receiving, by said software application, first login information from said first user in response to said first specified login procedure, said first login information consisting of a first user identity and a first password for said first user, wherein said first password comprises a first alpha numeric sequence;

first authenticating, by said software application, said first user based on said first login information;

after said first authenticating determining, by a computer processor executing said software application, a home domain associated with said first user, said home domain associated with a second set of login process rules, a second Web server instance comprising a second port, said home company, and a second set of software application access rules, said home domain different from said first domain, said home domain associated with said first user and said home company, said first domain associated with said first company, said home company different from said first company, said software application associated with said first company and said home company, said first domain associated with said first port, said home domain associated with said second port, said first port differing from said second port;

presenting, by said software application in response to said determining said home domain and said first request, an additional login procedure for said first user based on said second set of software application access rules;

receiving, by said software application, additional login information from said first user in response to said second specified login procedure, said second login information consisting of an additional user identity and a second password for said first user, wherein said second password comprises a second alpha numeric sequence differing from said first alpha numeric sequence, said second user identity differing from said first user identity;

additionally authenticating, by said software application, said first user based on said additional login information;

determining, by said software application executing a plurality of action modules, a third set of login process rules, said third set of login process rules associated with a combination of said first domain and said home domain, said third set of login process rules different from said second set of login process rules and said first set of login process rules, said plurality of action modules comprising a login action module, a home action module, a user role module, and a user mapping service module;

retrieving, by said software application, said third set of login process rules from said data;

second enforcing, by said software application, said third set of login process rules;

transmitting to said first user, by said software application, results of said second enforcing, wherein said third set of login process rules comprises a rule specifying a second specified login procedure for said first user;

presenting in response to said second enforcing and said first request, by said software application, said second specified login procedure for said first user;

receiving, by said software application, second login information from said first user in response to said second specified login procedure, said second specified login information consisting of a home company identity and a second password for said first user said second password consisting of a second alpha numeric sequence differing from said first alpha numeric sequence;

second authenticating, by said software application, said first user in response to said second login information;

transmitting to said first user, by said software application, authentication data in response to said second authenticating;

enforcing, by said software application, a first additional set of login process rules;

presenting based on said enforcing said first additional set of login process rules, by said software application, a first additional specified login procedure for said first user;

receiving, by said software application, first additional login information from said first user in response to said first additional specified login procedure, said first additional login information consisting of an alternative user identity and an alternative password for said first user;

authenticating, by said software application, said first user based on said first additional login information;

authorizing, by said software application based on said authenticating, said first authenticating, said additionally authenticating, and said second authenticating, said first user to access portions of said software application, said portions of said software application associated with first specified roles and authority to perform first actions associated with said portions of said software application; and disabling, by said software application based on said first set of login process rules, said first set of software application access rules, and an association with said first port and said second port, said first user from accessing additional portions of said software application.

14. The process of claim 13, wherein said method further comprises:

retrieving, by said software application, a third set of software application access rules from said data, said third set of software application access rules associated with said combination of said first domain and said home domain, said third set of software application access rules different from said second set software application access rules and said first set of software application access rules;

third enforcing, by said software application, said third set of software application access rules;

determining, by said software application, a first set of sections of said software application that said first user is allowed to access, said determining said first set of sections based on said third enforcing;

authorizing, by said software application, said first user to access first set of sections of said software application, said first set of sections of said software application associated with roles and authority to perform actions associated with said first set of sections of said software application; and transmitting to said first user, by said software application, authorization data associated with said authorizing in response to said authorizing.

15. The process of claim 14, wherein said method further comprises:

receiving from said first user, by said software application, a command for disabling said access to said first set of sections of said software application;

receiving from said first user, by a software application within a computing system, a second request for access to said software application;

determining, by said software application, a second domain associated with a second current location of said first user, said second domain different from said first domain and said home domain, said second domain associated with a fourth set of login process rules and a fourth set of software application access rules, said fourth set of software application access rules different from said third set of software application access rules, said second set software application access rules, and said first set of software application access rules, said fourth set of login process rules different from said third set of login process rules, said second set of login process rules, and said first set of login process rules;

fourth enforcing, by said software application, said fourth set of login process rules;

presenting based on said fourth enforcing, by said software application, a third specified login procedure for said first user;

receiving, by said software application, third login information from said first user in response to said third specified login procedure, said third login information comprising said identity for said first user;

third authenticating, by said software application, said first user based on said third login information;

determining, by said software application, said home domain associated with said first user, said home domain different from said second domain;

retrieving, by said software application, a fifth set of login process rules from said data, said fifth set of login process rules associated with a combination of said second domain and said home domain, said fifth set of login process rules different from said fourth set of login process rules, said third set of login process rules, said second set of login process rules, and said first set of login process rules; and fifth enforcing, by said software application, said fifth set of login process rules;

transmitting to said first user, by said software application, results of said fifth enforcing.

16. The process of claim 15, wherein said first domain comprises a first computer network, wherein said second domain comprises a second computer network, and wherein said first computer network is different from said second computer network.

17. The process of claim 13, wherein said third set of login process rules comprises a rule denying said first user from accessing said software application, and wherein said method further comprises:
denying based on said second enforcing, by said software application, said first user from accessing said software application.

18. The process of claim 13, wherein said data comprises a user profile, and wherein said user profile comprises said third set of login process rules.

19. A computer program product, comprising a computer readable program storage device comprising data and a computer readable program code embodied therein, said computer readable program code adapted to implement an access method within a computing system, said access method comprising:
receiving from a first user associated with a home company, by a software application within said computing system, a first request for access to said software application;
determining, by said software application, a first domain associated with a first current location of said first user, said first domain associated with a first set of login process rules, a first company Intranet for a first company differing from said home company, a first Web server instance consisting of a first port, and a first set of software application access rules, said home company residing at a location differing from said current location;
first enforcing, by said software application, said first set of login process rules;
presenting in response to said first enforcing and said first request, by said software application, a first specified login procedure for said first user;
receiving, by said software application, first login information from said first user in response to said first specified login procedure, said first login information consisting of a first user identity and a first password for said first user, wherein said first password comprises a first alpha numeric sequence;
first authenticating, by said software application, said first user based on said first login information;
after said first authenticating determining, by a computer processor executing said software application, a home domain associated with said first user, said home domain associated with a second set of login process rules, a second Web server instance comprising a second port, said home company, and a second set of software application access rules, said home domain different from said first domain, said home domain associated with said first user and said home company, said first domain associated with said first company, said home company different from said first company, said software application associated with said first company and said home company, said first domain associated with said first port, said home domain associated with said second port, said first port differing from said second port;
presenting, by said software application in response to said determining said home domain and said first request, an additional login procedure for said first user based on said second set of software application access rules;
receiving, by said software application, additional login information from said first user in response to said second specified login procedure, said second login information consisting of an additional user identity and a second password for said first user, wherein said second password comprises a second alpha numeric sequence differing from said first alpha numeric sequence, said second user identity differing from said first user identity;
additionally authenticating, by said software application, said first user based on said additional login information;
determining, by said software application executing a plurality of action modules, a third set of login process rules, said third set of login process rules associated with a combination of said first domain and said home domain, said third set of login process rules different from said second set of login process rules and said first set of login process rules, said plurality of action modules comprising a login action module, a home action module, a user role module, and a user mapping service module;
retrieving, by said software application, said third set of login process rules from said data;
second enforcing, by said software application, said third set of login process rules;
transmitting to said first user, by said software application, results of said second enforcing, wherein said third set of login process rules comprises a rule specifying a second specified login procedure for said first user;

presenting in response to said second enforcing and said first request, by said software application, said second specified login procedure for said first user;

receiving, by said software application, second login information from said first user in response to said second specified login procedure, said second specified login information consisting of a home company identity and a second password for said first user said second password consisting of a second alpha numeric sequence differing from said first alpha numeric sequence;

second authenticating, by said software application, said first user in response to said second login information;

transmitting to said first user, by said software application, authentication data in response to said second authenticating;

enforcing, by said software application, a first additional set of login process rules;

presenting based on said enforcing said first additional set of login process rules, by said software application, a first additional specified login procedure for said first user;

receiving, by said software application, first additional login information from said first user in response to said first additional specified login procedure, said first additional login information consisting of an alternative user identity and an alternative password for said first user;

authenticating, by said software application, said first user based on said first additional login information;

authorizing, by said software application based on said authenticating, said first authenticating, said additionally authenticating, and said second authenticating, said first user to access portions of said software application, said portions of said software application associated with first specified roles and authority to perform first actions associated with said portions of said software application; and disabling, by said software application based on said first set of login process rules, said first set of software application access rules, and an association with said first port and said second port, said first user from accessing additional portions of said software application.

20. The computer program product of claim 19, wherein said access method further comprises:

retrieving, by said software application, a third set of software application access rules from said data, said third set of software application access rules associated with said combination of said first domain and said home domain, said third set of software application access rules different from said second set software application access rules and said first set of software application access rules;

third enforcing, by said software application, said third set of software application access rules;

determining, by said software application, a first set of sections of said software application that said first user is allowed to access, said determining said first set of sections based on said third enforcing;

authorizing, by said software application, said first user to access first set of sections of said software application, said first set of sections of said software application associated with roles and authority to perform actions associated with said first set of sections of said software application; and transmitting to said first user, by said software application, authorization data associated with said authorizing in response to said authorizing.

21. The computer program product of claim 20, wherein said access method further comprises:

receiving from said first user, by said software application, a command for disabling said access to said first set of sections of said software application;

receiving from said first user, by a software application within a computing system, a second request for access to said software application;

determining, by said software application, a second domain associated with a second current location of said first user, said second domain different from said first domain and said home domain, said second domain associated with a fourth set of login process rules and a fourth set of software application access rules, said fourth set of software application access rules different from said third set of software application access rules, said second set software application access rules, and said first set of software application access rules, said fourth set of login process rules different from said third set of login process rules, said second set of login process rules, and said first set of login process rules;

fourth enforcing, by said software application, said fourth set of login process rules;

presenting based on said fourth enforcing, by said software application, a third specified login procedure for said first user;

receiving, by said software application, third login information from said first user in response to said third specified login procedure, said third login information comprising said identity for said first user;

third authenticating, by said software application, said first user based on said third login information;

determining, by said software application, said home domain associated with said first user, said home domain different from said second domain;

retrieving, by said software application, a fifth set of login process rules from said data, said fifth set of login process rules associated with a combination of said second domain and said home domain, said fifth set of login process rules different from said fourth set of login process rules, said third set of login process rules, said second set of login process rules, and said first set of login process rules; and fifth enforcing, by said software application, said fifth set of login process rules;

transmitting to said first user, by said software application, results of said fifth enforcing.

22. The computer program product of claim 21, wherein said first domain comprises a first computer network, wherein said second domain comprises a second computer network, and wherein said first computer network is different from said second computer network.

23. The computer program product of claim 19, wherein said third set of login process rules comprises a rule denying said first user from accessing said software application, and wherein said access method further comprises:

denying based on said second enforcing, by said software application, said first user from accessing said software application.

24. The computer program product of claim 19, wherein said data comprises a user profile, and wherein said user profile comprises said third set of login process rules.

* * * * *